US006473246B1

(12) United States Patent
Chao

(10) Patent No.: US 6,473,246 B1
(45) Date of Patent: *Oct. 29, 2002

(54) ELECTRO-OPTICAL LIGHT BEAM DEFLECTOR

(75) Inventor: Yong-Sheng Chao, Storrs, CT (US)

(73) Assignee: Advanced Optical Technologies, Inc., E. Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/812,055

(22) Filed: Mar. 19, 2001

Related U.S. Application Data

(63) Continuation-in-part of application No. 09/503,828, filed on Feb. 15, 2000, now Pat. No. 6,204,955, which is a continuation-in-part of application No. 09/350,388, filed on Jul. 9, 1999, now abandoned.

(51) Int. Cl.[7] .............................. G02B 7/02; G02B 26/08
(52) U.S. Cl. ....................................... 359/813; 359/298
(58) Field of Search ................................ 359/813, 824, 359/298, 814, 318, 209, 210, 558, 245, 315

(56) References Cited

U.S. PATENT DOCUMENTS

| | | | | |
|---|---|---|---|---|
| 3,838,912 A | * | 10/1974 | Arimoto et al. ................ | 359/1 |
| 5,184,323 A | * | 2/1993 | Schildkraut e tal. ......... | 365/124 |
| 5,786,926 A | * | 7/1998 | Yamada ....................... | 359/250 |
| 5,894,363 A | * | 4/1999 | Yamada et al. .............. | 359/251 |
| 6,204,955 B1 | * | 3/2001 | Chao et al. .................. | 359/298 |
| 6,292,310 B1 | * | 9/2001 | Chao ........................... | 359/813 |
| 6,295,171 B1 | * | 9/2001 | Chao et al. .................. | 359/813 |

OTHER PUBLICATIONS

James F. Lotspeich, "Electrooptical Light–Beam Deflection", IEEE Spectrum, Feb. 1968, pp. 45–52.
Toshio Utsunomiya et al., "Optical Deflector Using PLZT Ceramics", Japanese Journal of Applied Physics, vol. 24, (1985) Supplement 24–2, pp. 281–283.
F.S. Chen et al., Light Modulation and Beam Deflection with Potassium Tantalate–Niobate Crystals, Journal of Applied Physics, vol. 37, No. 1, pp. 388–398, No date available.

* cited by examiner

Primary Examiner—Georgia Epps
Assistant Examiner—Saeed Seyrafi
(74) Attorney, Agent, or Firm—Morse, Altman & Martin

(57) ABSTRACT

A light beam deflector comprises an initial beam deflector that imparts a small initial deflection, and a beam deflection amplifier that increases the initial small deflection by a multiplication factor. The first of two initial beam deflector embodiments employs highly-electro-optic-sensitive materials and provides methods for reducing and eliminating their photorefractive effects, including the use of a suppressing light source, external electric fields, and temperature control. The second embodiment employs a multi-layer, iterative prism structure, increasing the aperture without increasing the supply voltage. The first of five embodiments of the beam deflection amplifier is a Keplerian telescope lens first stage and a negative lens system second stage. The second is a Galilean telescope lens first stage and a negative lens system second stage. The third is either a Keplerian or Galilean telescope lens alone. The fourth replaces the single second lens of the first stage with a compound lens system. The fifth uses a special sphere lens alone.

10 Claims, 6 Drawing Sheets

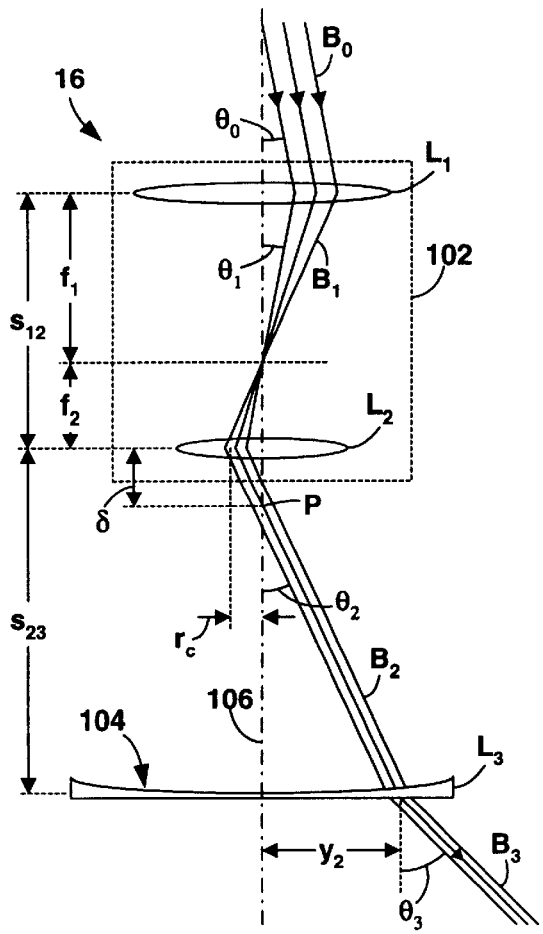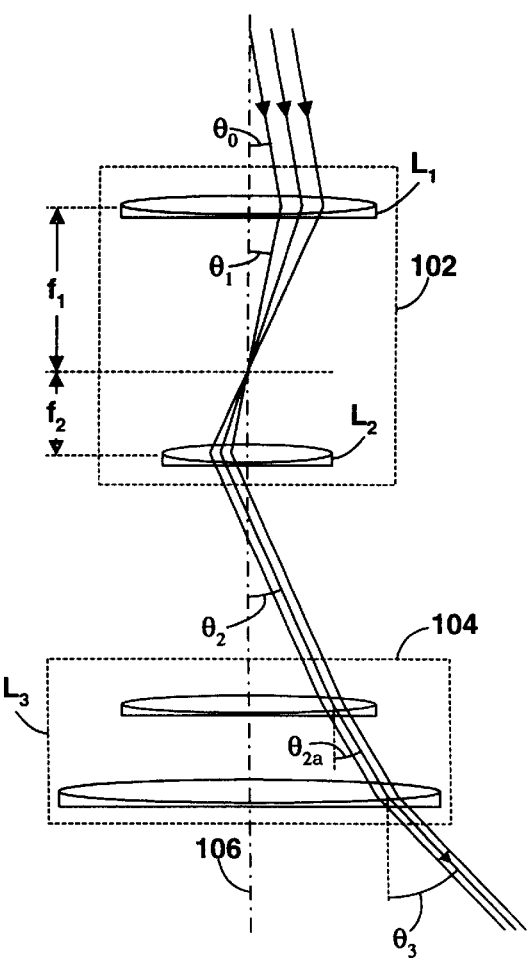
FIG. 7
FIG. 8

US 6,473,246 B1

ELECTRO-OPTICAL LIGHT BEAM DEFLECTOR

CROSS-REFERENCES TO RELATED APPLICATIONS

The present application is a continuation-in-part application of application Ser. No. 09/503,828 which is now U.S. Pat. No. 6,204,955, dated Feb. 15, 2000, for APPARATUS FOR DYNAMIC CONTROL OF LIGHT DIRECTION IN A BROAD FIELD OF VIEW in the names of Yong-Sheng Chao and Ying Zhao, which is a continuation-in-part application of application Ser. No. 09/350,388, dated Jul. 9, 1999, for APPARATUS FOR DYNAMIC CONTROL OF LIGHT DIRECTION IN A BROAD FIELD OF VIEW in the names of Yong-Sheng Chao and Ying Zhao, now abandoned.

STATEMENT REGARDING FEDERALLY SPONSORED RESEARCH OR DEVELOPMENT

Not Applicable

BACKGROUND OF THE INVENTION

1. Field of the Invention

This invention relates generally to light direction control, and more particularly, to techniques for the dynamic control of light propagation direction.

2. Description of the Related Art

The use of electro-optic methods for light beam deflection has long been discussed. When an electric field is applied to a particular light transmission medium, the index of refraction of the medium undergoes a small change, leading to a small change in the direction of an output light beam. Electro-optic light beam deflection techniques have found only limited practical applications, largely because of limitations that result in poor performance. For example, the largest achievable deflection angle is very small, usually in the milliradian (mrad) range (one mrad≈0.057°) . Also, direction resolution is poor. Typical resolution is on the order of $\frac{1}{10}$, that is, only about ten distinct directions within the deflection range can be resolved. For comparison, other standard light beam deflection methods, such as acoustooptical, can have a resolution on the order of $\frac{1}{1000}$.

BRIEF SUMMARY OF THE INVENTION

The object of the present invention is to provide an electro-optic light beam deflection system that has a relatively large deflection angle and a substantially enhanced resolution.

One significant improvement of electro-optic light beam deflection technique is the use of new materials having electro-optic coefficients much higher than those for the materials used in the prior art. These highly-electro-optic-sensitive materials have not been used for light deflection because of their severely detrimental "optical damage" effects, the so called photorefractive process. The present invention provides methods for reducing and eliminating photorefractive effects in those materials, making them useful as electro-optic light deflection media. The methods include the use of a suppressing light source, external electric fields, and temperature control.

The second significant improvement is to use a multi-layer structure in the deflector medium based on second order electro-optic effects. Such second order electro-optic deflectors substantially increase the aperture of the deflection medium without the need for increasing the supply voltage. With increased aperture, the angular resolution of the light deflection system is correspondingly increased.

The third significant improvement is to construct a light beam deflection system comprising an electro-optic deflector as an initial deflector and a geometric optics lens system as a deflection angle amplifier. With a deflection angle amplification, the system deflection angle can closely approach ±90°.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein:

FIG. 7 is a schematic diagram of the first embodiment of the beam deflection amplifier;

FIG. 8 is a schematic diagram of the first embodiment of the beam deflection amplifier with enhancement;

DETAILED DESCRIPTION OF THE INVENTION

Figure 1:
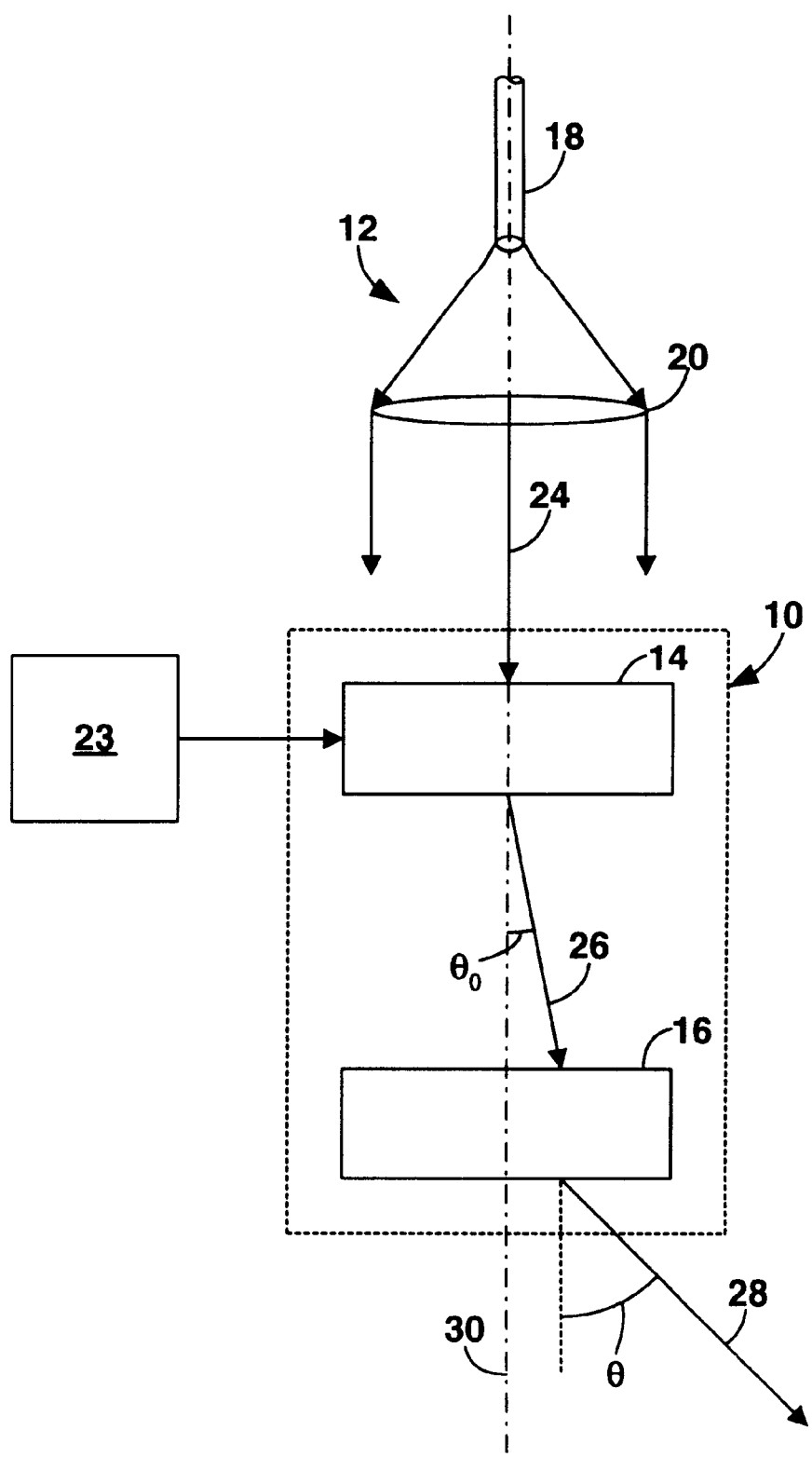
FIG. 1 is a block diagram of the basic apparatus of the present invention.

The basic light beam deflection system 10 of the present invention, a block version of which is shown in FIG. 1, comprises an initial dynamic beam deflector 14 and a beam deflection amplifier 16 based on classical geometric optics that provides an output light beam with an increased deflection angle. In the remainder of this specification, the initial dynamic beam deflector 14 is denoted simply as the "initial deflector" and the beam deflection amplifier 16 based on classical geometric optics is denoted as the "beam deflection amplifier" or simply "deflection amplifier."

The present invention 10 is intended for use with a light source 12 that comprises a light emitting device 18, such as a laser, light-emitting diode, lamp, or optical fiber as a light source, and a conventional optical system 20 to appropriately modify the light emitting device output to meet the specific requirements of the initial deflector 14 for optimal performance, as discussed below The techniques used in the light source 12 are standard and well-established.

The beam 24 from the light source 12 passes through the initial deflector 14, undergoing a small initial deflection $\theta_0$, as measured between the light beam direction and the optical axis 30 of the system. The initial deflector 14 is controlled by an external device 23. The initially deflected beam 26 then passes through the deflection amplifier 16, which increases the initial small deflection $\theta_0$ to an output deflection $\theta$, as measured between the direction of the output light beam 28 and the optical axis 30 of the system.

A. The Initial Deflector 14

The initial deflector 14 is a dynamically controllable light beam deflector based on electro-optic effects. In the prior art, there are two basic configurations of electro-optic beam deflectors, both of which can be used with the present invention. The first is based on an iterated prism structure and the second is based on a gradient electric field structure. See the article James F. Lotspeich, "Electrooptic light-beam deflection", IEEE Spectrum, February 1968, pp 45–52.

Figure 2:
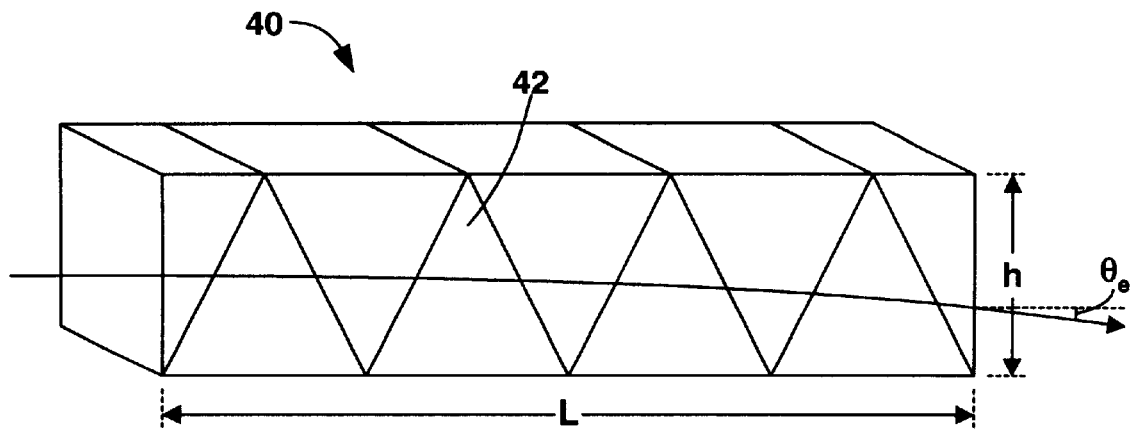
FIG. 2 is a diagram of a prior art iterated prism electro-optic beam deflector.

As shown in FIG. 2, the iterated prism structure 40 includes a sequence of prisms 42, each providing a small, additional deflection angle for the incident beam. The index of refraction of the prisms body is controlled by an electric field, which is specifically identified as "the electric field for electro-optic deflection". The incident light beam being deflected is specifically identified as the "electro-optic deflection light beam". The "electro-optic effect" is defined as the change of index of refraction under an electric field. The total deflection angle $\theta_e$ for all the iterated prisms 42 is $\theta_e = 2V \times \delta \times L/h$, where V is the voltage applied to the electrode pair, $\delta$ is a material-dependent constant that characterizes the electro-optic deflection sensitivity of the material, L is the total length, and h is the height of the prisms 42.

Figure 3:
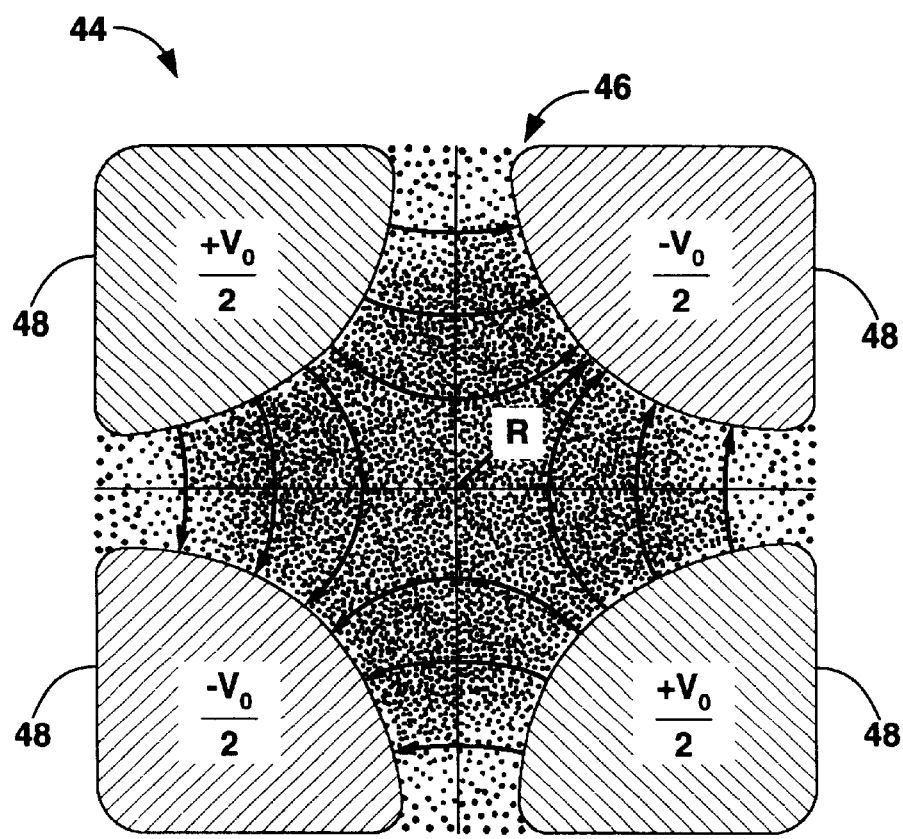
FIG. 3 is a diagram of a prior art field-gradient electro-optic beam deflector.

The second configuration is the field-gradient deflector 44, shown in FIG. 3. Because of the linear electro-optic effect, the index of refraction is proportional to the strength of the electric field for electro-optic deflection. Thus, when an electrical field gradient is created inside a piece of the electro-optic material 46, a gradient of index of refraction is produced. When a light beam passes through the material with a gradient of index of refraction, the direction of the light beam undergoes a deflection.

One way to create a field gradient is to use a group of quadrupole electrodes 48, where four cylinder electrodes, each shaped with a hyperbolic surface, are inserted in an electro-optic material 46. Voltages of $+V_0/2$ and $-V_0/2$ are applied alternately to the electrodes 48. A fairly uniform and constant field gradient of $dE_x/dy$, and $dE_y/dx$ is produced in the center region. When a light beam passes through the center region, it undergoes a deflection in the electro-optic material with a gradient of index of refraction. The deflection angle $\theta_e$ is proportional to the gradient of the index of refraction, hence proportional to the voltage applied, as follows: $\theta_e = V_0 \times \delta \times L/R^2$, where $V_0$ is the voltage applied on the electrode pair (each with $V_0/2$), $\delta$ is a material-dependent constant which characterizes the electro-optic deflection sensitivity of the material, L is the length of the cylinder, and R is the radius of the center region enclosed by the quadrupole electrodes 48.

In the prior art, when the voltage is approximately 1 kV and the value for h or R is approximately 1 mm, the maximum deflection angle of the electro-optic deflector is typically less than about 1 mrad.

The initial deflector 14 as implemented in the present invention has three preferred embodiments.

1. First Initial Deflector Embodiment

The most important aspect of the first embodiment is the use of new materials that significantly enhance the deflection sensitivity of the initial deflector 14. The new materials have an electro-optic coefficient much larger than that of materials that are currently used for light beam deflection. For example, in prior art, the best electro-optic crystals for light beam deflection are lithium niobate ($LiNbO_3$), lithium tantalate ($LiTaO_3$), and KDP ($KH_2PO_4$) Lithium tantalate has a linear electro-optic coefficient $r_{33}=35.8$ pm/V, or $35.8 \times 10^{-6}$ mm/kV, making it the largest linear electro-optic coefficient among all the materials that are qualified for light beam deflection. When an electric field is applied to the crystal along the appropriate direction, the change of the index of refraction is $$n(E)-n(0)=-(\tfrac{1}{2})r_{33} \times n(0)^3 \times E \qquad (1)$$

where $n(E)-n(0)$ is the change in the index of refraction due to the electric field E and $n(0)=2.18$ is the index of refraction with zero electric field. Using a typical numeric example for illustration, when the electric field E is as strong as 1 kV/mm, the change in the index of refraction is only approximately $1.85 \times 10^{-4}$, which is still too small for adequate light beam deflection.

On the other hand, materials have been found that exhibit much larger electro-optic coefficient values. certain single crystal materials, such as SBN ($Sr_{1-x}Ba_xNb_2O_6$, where x is the percentage composition, in the range of $0.25<x<0.75$), have an electro-optic coefficient 30 to 100 times larger than that of the above mentioned materials. However, in 1960s, it was found that after illumination by a light beam, these crystals tend to incur a kind of "optical damage" inside the material. The "optical damage" is a phenomenon that, under light illumination, an originally homogeneous crystal material becomes spatially inhomogeneous in its index of refraction. As a consequence, when a light beam passes through such a material, the well-behaved light beam becomes severely distorted. Because of this, all the materials vulnerable to "optical damage" effects were excluded from use for light beam deflection.

Since the discovery of "optical damage" in 1960s, the phenomenon has been extensively studied and identified as a new physical process called photorefractivity. It was discovered that the light-induced change of index of refraction is due to the light-induced redistribution of electric charge inside the material. A light-induced inhomogeneous electric charge distribution inside the material produces a strong inhomogeneous internal electric field which, in turn, causes an inhomogeneous distribution of index of refraction. The light-induced internal electric field, which is electrodeless and inhomogeneous, is specifically identified as the "inhomogeneous electric field". Those materials having the most pronounced photorefractive effects are generally categorized as photorefractive materials, and are excluded from use for light beam deflection in the prior art because of the severe detrimental effects.

Due to the revelations of photorefractive physics research, the light-induced spatial distribution of the index of refraction inside the photorefractive crystals has become fairly predictable.

The present invention provides effective means for reducing the "optical damage" effects. The basic approach of the present invention is to use the photorefractive material under light beam deflection conditions as a normal electro-optic material and, at the same time, to use effective measures to eliminate or to reduce the undesired inhomogeneous redistribution of electric charge in these crystals. The present invention uses three methods individually or in combination to suppress the light-induced inhomogeneous distribution of electric charges in the crystals: (a) use of a suppressing light source, (b) use of a homogenizing electric field, and (c) creating a homogenizing temperature environment.

(a) Use of a Suppressing Light Source

The first method for eliminating photorefractive interference is to use an additional light source with sufficient light intensity to suppress the inhomogeneous redistribution of light-induced electric charge inside the material. The theoretical basis, and the underlying physical mechanism responsible for ensuring the material's internal homogeneity through additional intense light illumination, is to increase the photoconductivity of the material. The photoconductivity of a material is generally proportional to the intensity of illumination. With the increase of the photoconductivity, the tendency to accumulate inhomogeneous local electric charge is substantially reduced. In fact, when the conductivity of the material is very large, such as for a metallic materials, no internal inhomogeneous charge distribution is permitted to exist at all. The reason is that, if such a local electric charge exists, it would create an electric field, generating a current that is proportional to the conductivity of the material. Because of the increased photoconductivity, the large current, in return, leads to substantially reduced or to eliminated inhomogeneity of charge distribution. The higher the illumination intensity, the faster and the more the local inhomogeneous charge accumulation will disappear.

Figure 4:
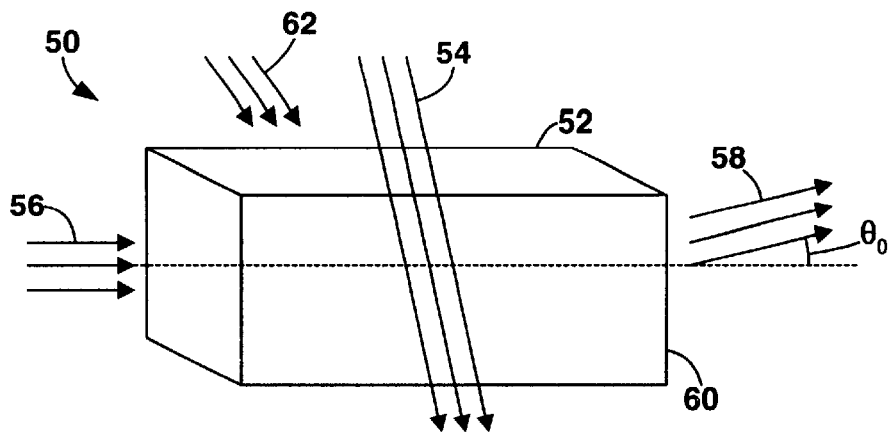
FIG. 4 is a diagram of the first embodiment of the initial beam deflector.

The basic configuration 50 of the first embodiment of the electro-optic initial deflector with suppressing light illumination is shown in FIG. 4.

An electric field 54 for light beam deflection $E_{defl}$ is applied appropriately to a piece of material 52 transparent to the desired optical frequencies, the deflection medium, with a sufficiently large electro-optic coefficient. An incident light beam 56 having its electric vector along an appropriately chosen polarization direction enters the deflection medium 52 and becomes a deflected output light beam 58 at the opposite surface 60. The polarization direction of the electric field vector of the incident light beam 56 must have a strict specific relationship with the direction of the symmetry axis of the specific crystal used as an electro-optic deflection material. Such a relationship is a standard practice, and is well documented in the prior art. A suppressing light source 62 with a variety of possible spatial and/or temporal configurations illuminates the deflection medium 52. The light intensity of suppressing light source 62 must be strong enough to suppress the inhomogeneous distribution. Light-induced charge distribution in photorefractive materials can be quantitatively described by the Kukhtarev equations (see, for example, N. V. Kukhtarev et al., "Holographic storage in electro-optic crystals", Ferroelectrics, Vol. 22, pp. 949–960, 1979). This well-approximated linear equation system is solvable, so every quantity is predictable according to appropriate experimental data. For illustration of most basic features, assume every quantity is in a steady state. Then, if there exists an accumulated inhomogeneous charge at two neighboring local points inside the material, the charge will create an electric field $E_{int}$ and an electric current j. The charge distribution inhomogeneity is related to the gradient distribution of the illumination field. Then, using the formulas from a standard textbook ("Fundamental of Photonics" by Saleigh and Teich, p. 730):

$$E_{int}(x)=(K_B T/e)\times[dI(x)/dx]/I(x) \quad (2)$$

where $E_{int}$ is the internal local electric field produced by a distribution gradient $dI(x)/dx$ of illumination light field $I(x)$, $K_B$ is Boltzmann constant, T is temperature, and e is electron charge. When there are two light illumination fields, as in the configuration of FIG. 4, the illumination of the deflection beam $I_{defl}(x)$ and the illumination of a suppressing illumination $I_{supr}(X)$ sum as $I(x)=I_{defl}(x)+I_{supr}(x)$. The illumination due to the deflection light beam $I_{defl}(x)$ may have certain inevitable nonuniform spatial distribution, so $d[I_{defl}(x)]/dx \ne 0$. On the other hand, the suppressing illumination $I_{supr}(x)$ can be well-controlled to have an essentially uniform spatial distribution, so $d[I_{supr}(x)]/dx=0$ and $I_{supr}(x)=I_{supr}=$ constant. At the same time, the suppressing illumination can be chosen to have a high intensity $I_{supr}(x)>>I_{defl}(x)$. Thus, the suppressed internal electric field $$E_{supr}=(K_B T/e)\times\{d[I_{defl}(x)]/dx\}/[I_{defl}(x)+I_{supr}] \quad (3)$$

For comparison, if $I_{supr}=0$, the internal electric field produced due to illumination by only the deflection beam is $$E_{defl}=(K_B T/e)\times\{d[I_{defl}(x)]/dx\}/I_{defl}(x) \quad (4)$$

Thus, due to the suppressing illumination, the internal electric field is reduced by a factor of $I_{defl}(x)/(I_{defl}(x)+I_{supr})$. The above simplified quantitative relationships (2), (3), and (4) are used only for demonstration of some most basic features of the process. A more accurate description can be obtained through the solution of the Kukhtarev equations. However, these basic features will remain approximately the same.

The suppressing illumination intensity can be larger than that of the deflection light beam by a factor from 2 to a relatively large number, for example, 1,000. There is no restriction on the selection of the wavelength, coherence, polarization, and/or collimation of the suppressing light source. So the suppressing light source can use low cost conventional light sources such as light-emitting diodes (LED) and incandescent lamps with much higher power than that of the laser used as the incident beam source 12. For example, if the laser power is between 0.1 mW and 10 mW, the suppressing illumination light intensity can be chosen as 0.1 W to 10 W. Thus, the photorefractive effects, which the prior art presumes to be a severe detriment for light beam deflection, can be reduced by orders of magnitude, and the unfavorable "optical damage" effects can be essentially eliminated.

As indicated above, there are no restrictions on the spatial and temporal behavior of the suppressing light source 62. For example, the suppressing light source 62 can move arbitrarily relative to the deflection medium 62.

Figure 5:
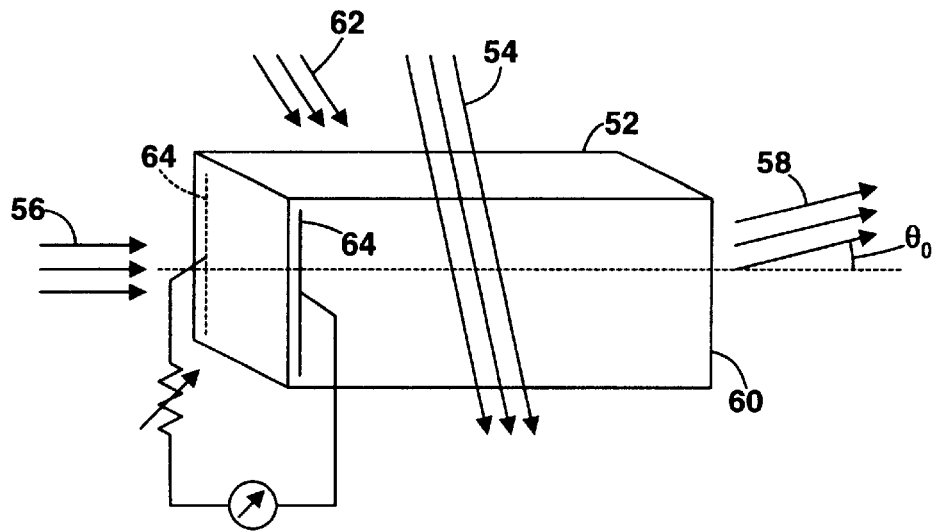
FIG. 5 is a diagram of an optional configuration of the initial beam deflector embodiment of FIG. 4.

Optionally, as shown in FIG. 5, one or more additional pairs of electrodes 64 can be connected to the deflection medium 52, and the appropriate voltage can be applied to the electrode pairs, with closed electric circuit loops. This provides further control of the total number of charge carriers inside the material 52. Whether and how much the use of additional circuit loops can further reduce the internal inhomogeneity of the material under intense illumination is dependent on a number of factors, such the specific spatial-temporal distribution of the suppressing illumination and the specific data regarding the spatial-temporal distribution of the charge carriers. The benefit closed circuit loops can be predicted by the data of the numeric solution of the Kukhtarev equation systems.

(b) Use of a Homogenizing Electric Field

It has been established that a uniform external electric field can have the effect of reducing or eliminating the inhomogeneous distribution of electric charge, inhomogeneous distribution of index of refraction, or inhomogeneous distribution of the material polarization of the ferroelectric materials. Such an external electric field with an uniform field strength can be used for achieving homogenizing of the crystal material and is defined as a homogenizing electric field. The homogenizing electric field is independent and distinctly different from the external electric field for electro-optic deflection, both in hardware and in the method of use.

The homogenizing electric field can be used in two ways, individually or combined with a temperature change. First, according to standard practice, a homogenizing electric field can be used together with an appropriate temperature environment. When a ferroelectric crystal material is severely inhomogeneous, the temperature of the material is changed to something approaching or crossing the Curie point of the material, the transition temperature marking a change in the magnetic or ferroelectric properties of a substance. At the same time, a homogenizing electric field is applied. Then the temperature is gradually changed back to its working temperature, for example, room temperature. Finally, the homogenizing electric field is removed. The result of this process is to produce thoroughly homogenized material.

The second way a homogenizing electric field can be used to reduce the material inhomogeneity is to apply a uniform external electric field to the material. Such an external homogenizing electric field can be used simultaneously or interruptively with the external electric field for the electro-optic deflection. When used simultaneously, there are two independent electric fields applied to the material, each having a pair of well-defined electrodes. In simultaneous use, care must be taken that the electro-optic deflection is not affected by the homogenizing electric field. For example, for certain crystals, the electro-optic coefficient $r_{33}$ is large, while the electro-optic coefficient $r_{13}$ is close to zero. In that case, when the electro-optic deflection electric field is applied along the Z axis and the homogenizing electric field is applied along the X axis, the electro-optic deflection will have the largest effect and will not be adversely affected by the homogenizing field. When used interruptively, the electro-optic deflection function must be temporarily halted in order to perform the homogenizing process, then the electro-optic deflection process can be resumed.

The necessary field strength for the homogenizing is case-dependent. It is different for different materials and how the material is used for electro-optic deflection.

(c) Creating a Homogenizing Temperature Environment

There are two way to create an appropriate uniform temperature environment for reducing inhomogeneous distribution of the electro-optic deflection material. The first is described above relative to the homogenizing electric field.

The second way is to create a uniform temperature condition for the material at something approaching or crossing the Curie point, and then gradually returning the temperature back to its working condition, for example, to room temperature. It is known that when the temperature changes, the conductivity of the material changes, so the inhomogeneity of electric charges can be reduced or eliminated. Such change of charge distribution can be quantitatively predicted.

Usually temperature change is a slow process and the temperature change may affect the normal function of the light beam deflector 12. So, when the temperature changes the light beam deflection function may have to be temporarily interrupted. After the nonunformity of the index of refraction inside the material is removed, the light beam deflection is resumed.

The following is a more detailed list of photorefractive materials that can be used for light beam deflection. With the above described procedures for suppressing photorefractive effects, all materials with a sufficiently large electro-optic coefficient, including all photorefractive materials, can be used for light beam deflection. The materials include, but are not limited to ferroelectric oxides. The first group of ferroelectric oxides includes tungsten bronzes, such as SBN ($Sr_{1-x}Ba_xNb_2O_6$), BNN ($Ba_2NaNb_5O_{15}$), etc. The second group includes perovskites, such as barium titanate ($BaTiO_3$), potassium niobate ($KNiO_3$), KTN ($KTa_{1-x}Nb_xO_3$), etc. The third group includes ilmenites, such as lithium niobate ($LiNbO_3$), lithium tantalate ($LiTaO_3$), etc.

It was found that if the crystal material contains a small amount of certain impurity molecules, such as iron or cerium, the photo-ionization rate is substantially increased. It must mentioned that, in photorefractive research, it is highly desirable that the appropriate amount of impurity molecules (dopants) be included in the above mentioned materials in order to enhance the photorefractive effects. In contrast, materials for use in the present invention must have a purity as high as possible; dopants are undesirable for the present invention. This is a fundamental difference between methods of the photorefractive research and the present invention.

Note that in prior art, Chen et al. (F. S. Chen et al., "Light modulation and beam deflection with potassium tantalate-niobate crystals, Journal of Applied Physics, Vol. 37, pp 388–398) used the crystal KTN for light beam deflection. The significant differences between the methods Chen and others and those of the present invention are twofold. First, Chen does not use suppressing light illumination, while in the present invention, the suppressing illumination and other above-described methods are essential for reducing the "optical damage". Second, Chen's light beam deflector comprises a complete system, while in the present invention, the electro-optic deflector is used only as an initial deflector, which must be followed by a light beam deflection amplifier.

2. Second Initial Deflector Embodiment

The second embodiment of the initial deflector employs transparent ceramic materials for light beam deflection. Certain transparent ferroelectric ceramic materials, such as PLZT (lead lanthanum zirconate titanate), have a large second order electro-optic coefficient. In the second order electro-optic effect, the change in the index of refraction is dependent on the square of the electric field, as so $$n(E)-n(0)=-(\tfrac{1}{2})R_{ij}\times n(0)^3\times E^2 \tag{5}$$

where $R_{ij}$ is the second order electro-optic coefficient. Generally, $R_{ij}$ is a matrix.

Figure 6:
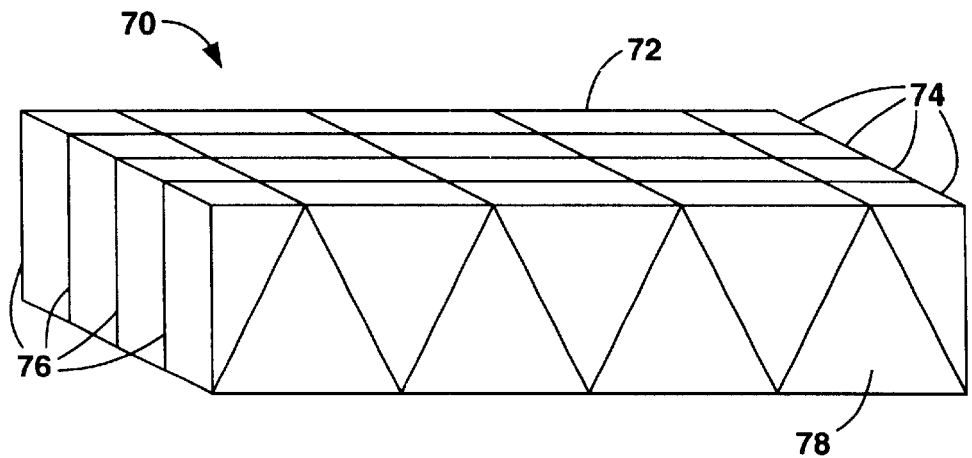
FIG. 6 is a diagram of the second embodiment of the initial beam deflector.

One configuration of this embodiment 70 is shown in FIG. 6. The deflection medium 72 is separated into N layers 74, where N is greater than one. Each layer 74 is sandwiched by a pair of electrodes 76, where a voltage V is applied to each pair of electrodes 76. Each layer 74 has an independent iterated prism 78 sandwiched in a pair of electrodes 76. One way to make the single layer is to cut the crystal into the desired shape and deposit a pair of conductive films on the sides. The conductive films act as electrodes. Another way is to cut the crystal into regular rectangular sheets and the conductive electrode is deposited as a series of triangles electrically connected together, so that the electric field is applied only within the triangular electrode area. Then the entire rectangular sheet of the crystal can be approximated as being composed of iterated prisms 78 (electric field is not zero) and filling material where electric field is always zero. Multiple sheets are stacked together.

The present invention takes advantage of the fact that the second order effect is dependent only on the absolute value of the electric field, and is independent of the direction of the electric field. Thus, the electric field can be applied alternately to each layer 72. If the order of the electrodes 76 is denoted a j, and the two electrodes 76 contacting with each other is taken as a single electrode, then the voltage value for the layer order 0 to N will be: $V_0=0$(ground), $V_1=V$, $V_2=0$, $V_3=V$, $V_4=0$, . . . When the deflection medium 72 is composed of N layers and each layer has a deflection voltage V, the power supply need only supply a voltage V to drive the entire deflection medium 72. Otherwise, the voltage for the electrode series must be: $V_0=0$(ground), $V_1=V$, $V_2=2V$, $V_3=3V$, $V_4=4V$, . . . , and the power supply must be able to supply a voltage N×V. The multi-layer structure has the advantage of significantly increasing the aperture of the deflection medium 72 under otherwise identical conditions. With the increased aperture, the direction resolution is correspondingly increased. It is well known that the minimum resolvable angle value $\theta_r$ is proportional to the dimension of the aperture $$\theta_r = 1.2 D/\lambda \qquad (6)$$

where D is the width or height of the receiving area of the deflection medium 72, as shown in FIG. 6, and λ is the wavelength of the deflected light. The number of resolvable directions is the maximum deflection angle divided by the minimum resolvable angle value: $N=\theta_{max}/\theta_r$. By using a multi-layer structure, the resolution can be increased to a relatively large number, for example, between 20 to greater than 100. The upper limit of the resolution is the acceptable value of the electrical capacitance of the deflection medium.

Note that in the prior art, Toshio Utsunomiya et al., "Optical Deflector Using PLZT Ceramics", Japanese Journal of Applied Physics, Vol. 24 (1985) Supplement 24-2, pp. 281–283, discloses an electro-optic deflector based on use of the ceramic material PLZT . There are two significant differences between Utsunomiya's deflector and the present invention. First, the deflector of the present invention has more than one layer, and the total power supply voltage requirement is as described above. Second, in the present invention, the electro-optic light deflector is used only as an initial deflector, and is followed by a light beam deflection amplifier, whereas Utsunomiya's device is a complete deflector.

3. Third Initial Deflector Embodiment

The third embodiment of the initial light deflector uses electro-optic deflectors of the prior art. In the prior art, there are two basic types of the electro-optic beam deflectors, both of which can be employed by the present invention. The first is based on an iterated prism structure and the second is based on a gradient electric field structure. See the article James F. Lotspeich, "Electrooptical light-beam deflection", IEEE Spectrum, February 1968, pp 45–52.

The significant difference between the standard electro-optic light beam deflectors of the prior art and the present invention is that the present invention uses the standard electro-optic light beam deflector only as an initial light beam deflector, which must be followed by a light beam deflection amplifier to provide a deflection system. As a result, the light beam deflection angle for the deflection system of the present invention is large, typically up to ±90°, while in the prior art, the largest deflection angle for the electro-optic deflector is much less than ±1°.

B. The Beam Deflector Amplifier 16

The beam deflection amplifier 16 multiplies the small initial deflection angle $\theta_0$ by an amplification factor A to result in a full deflection angle $\theta_0 A = 0$, where A>1. Typically, A will be constant for all values of $\theta_0$. However, the present invention contemplates that A may not be constant, but may be a function of the angle $\theta_0$ of the beam incident on the beam deflection amplifier 16. For example, A can be written as $A = A_1 + A_2 \times f(\theta_0)$, where the $A_1$ and $A_2$ are constants with the relation $A_1 >> A_2$, and $f(\theta_0)$ is a slowly changing function of $\theta_0$.

There are five preferred embodiments for the beam deflection amplifier 16.

1. First Beam Deflection Amplifier Embodiment

The first preferred embodiment of the beam deflection amplifier 16 comprises two stages of amplification, as shown in FIG. 7. The first amplification stage 102 is essentially a Keplerian telescope lens system, which comprises a pair of positive lenses $L_1$ and $L_2$. The second amplification stage 104 is a negative lens system $L_3$ optically coupled to the first amplification stage 102. The most important criteria of the present invention for achieving a large output deflection angle at the output of the second amplification stage 104 is to make sure that the light beam $B_2$ always angles away from the optical axis 106 after crossing the optical axis 106 at point P. A characteristic feature of the lens system structure for the second stage amplification of the first embodiment is that the center line of the light beam $B_2$ crosses the optical axis 106 only once after leaving the surface of lens $L_2$.

The beam deflection amplifier 16 must simultaneously fulfill the following three requirements: (1) if a collimated beam enters the deflection amplifier, a collimated beam must exit the deflection amplifier; (2) the deflection angle of the output beam must be larger than the non-zero deflection angle of the input beam; and (3) the output beam must have good beam quality. In quantitative terms, the aberration of the output beam must be correctable to an acceptable value. The following is a description of how these requirements are fulfilled for each amplification stage.

As indicated above, the first amplification stage 102 is a Keplerian telescope lens system, which comprises essentially a pair of positive lenses, lens $L_1$ having a focal length $f_1$ and lens $L_2$ having a focal length $f_2$, where $f_1 > f_2 > 0$. The two lenses are separated by a distance $s_{12}$ such that $f_1 + f_2 = s_{12}$. According to thin lens formulae, the focal length of the Keplerian telescope lens system is $f_{12} = f_1 \times f_2/(f_1 + f_2 - s_{12})$. Since $(f_1 + f_2 - s_{12}) = 0$, $f_{12}$ is infinite. Thus, the first amplification stage 102 meets the first two requirements: when a collimated light beam $B_0$ with a small deflection angle $\theta_0$ relative to the optical axis 106 is incident on lens $L_1$, the light beam $B_2$ from lens $L_2$ will also be collimated and will have a deflection angle $\theta_2$ relative to the optical axis 106 governed by the relationship $\tan(\theta_2/\theta_1) \approx \theta_2/\theta_1 = f_1/f_2 > 1$. This is an established method for increasing the deflection angle of a light beam. However, two constraints on the Keplerian lens system limit the maximum output deflection angle. First, the amplification factor $A_{12} = f_1/f_2$ requires that $f_1 >> f_2$. Generally this means that $f_1$ is on the order of 5 to 10 times larger than $f_2$. However, this ratio is limited by how large $L_1$ can be made and how small $L_2$ can be made.

And since the focal length $f_1$ is closely related to the curvature radius $r_1$ of lens $L_1$, the size of lens $L_2$ must be small. Additionally, in order keep aberrations within an acceptable range, the light beam $B_0$ must impinge upon only a small central area of $L_1$ with a radius value $r_c << r_1$. Otherwise, the aberrations would be too large.

Note that it may be possible to improve this factor to some extent by inserting an additional lens called a "field lens" at the common focal plane of lens system $L_1 + L_2$. The description of this standard procedure can be found in optics textbooks.

The second constraint is that the output light beam $B_2$ from lens $L_2$ must always cross the optical axis 106. At the maximum deflection angle, the output light beam must be bent from the edge of the central area at radius $r_c$ to the optic axis. The output deflection angle $\tan(\theta_2) \leq r_c/\delta$, where $r_c$ cannot be large and $\delta$ cannot be very small. Usually, the maximum deflection angle for a Keplerian lens system is only about 10° if a reasonable output light beam quality is required. Reducing the value $\delta$ and increasing the value $r_c$ tend to exponentially increase aberration, drastically degrading light beam quality.

In prior art, there is no effective procedure for improving this constraint. The only improvement in prior art is the use of a compound positive lens to replace the single positive lens $L_2$. However, the improvement is very much limited because the fundamental lens aberration relationship determines that the aberration increases at least as the third power of the value of ratio ($r_c/\delta$). In order to increase the maximum output angle $\theta_2$ (and $\tan(\theta_2)$), one has to increase the ratio ($r_c/\delta$). But a slight increase of the ratio ($r_c/\delta$) leads to a drastic increase in the aberration and degradation of the beam quality. On the other hand, it should be mentioned that, in reality, the small value for the maximum deflection angle is not a serious problem for the Keplerian lens system when used as a telescope, because for the observation of a remote scene through human eyes does not require a very large deflection angle. However, for many modern optical systems, such as for use with the present invention, the small maximum output deflection angle is often unacceptable. To solve this problem, the present invention introduces a second stage of amplification.

The basic approach to the second stage of amplification is that, after the beam $B_2$ has crossed the optical axis 106 at the point P, it is always angling away from optical axis 106, so beam $B_2$ does not cross the optical axis 106 more than once.

For quantitative analysis, note that, because $f_1 >> f_2$, the output light beam $B_2$ from lens $L_2$ is narrow. Because it is narrow, light beam $B_2$ can be represented by its center ray emitted from point P. A negative lens $L_3$ with a focal length $f_3 < 0$ and located at distance $s_{23}$ from $L_2$ tends to angle the beam $B_3$ outwardly by an additional slope of $\Delta u_{23} = u_3 - u_2 = \tan(\theta_3) - \tan(\theta_2)$, where u is the slope of the corresponding beam relative to the optical axis 106. As shown in FIG. 7, as a first order approximation, according to paraxial ray tracing theory, $\Delta u_{23} = \tan(\theta_3) - \tan(\theta_2) = y_2/f_3$, where $y_2$ is the height of the beam $B_2$. Since $y_2 = u_3 \times s_{23}$, the amplification factor of the second stage $A_3 = s_{23}/f_3$. As long as the distance $s_{23}$ is sufficiently large and lens $L_3$ is constructed with an appropriately large size, the amplification factor can range between approximately 2 and 10 and the output deflection angle can be as large as 90°.

In addition to the requirement that the lens system provide amplification, it is also necessary that the lens system output a beam with good beam quality. If the beam $B_2$ from lens $L_2$ is a collimated beam, the output beam $B_3$ will be divergent due to the negative lens $L_3$. By appropriately choosing the parameters $f_2$, $f_3$, $s_{23}$, and fine-tuning the distance $s_{12}$, all the required performance parameters can be consistently achieved. To show that this is true, consider lens pair $L_3 + L_2$ and look into lens $L_3$ in the reverse direction, that is, from the output. When using thin lens approximations, the combined back focal length $bfl_{23}$ for lens pair $L_3 + L_2$ is $bfl_{32} = f_2 \times (f_3 - s_{23})/(f_2 + f_3 - s_{23})$. The back focal length $bfl_{32}$ is defined as the distance from the back surface of lens $L_2$ (the "back surface" of lens $L_2$ is the surface of lens $L_2$ on the $L_1$ side) to the focal point of lens system $L_3 + L_2$ along the direction from $L_3$ to $L_2$. If $f_2 > 0$, $f_3 = -m_3 \times f_2 < 0$, where $m_3$ is an integer between 1 and 5, inclusive, and $s_{23} = -m_s \times f_3 = m_s \times m_3 \times f_2$, where $m_s$ is an integer between 1 and 5, then the back focal length $bfl_{23} = f_2 \times (m_3 + m_s \times m_3)/(m_3 + m_s \times m_3 - 1)$. Use of integer parameters $m_3$ and $m_s$ here is only for convenience in order to express the values $s_{23}$ and $f_3$ through $f_2$. The integer parameters $m_3$ and $m_s$ can vary in a range to meet different amplification requirements. Taking $m_3 = 3$ and $m_s = 3$, the back focal length would be $bfl_{23} = f_2 \times 12/11$, only slightly longer than $f_2$. Thus, according to the above analysis under thin lens approximation, in order to maintain a collimated output light beam $B_3$, only distance $s_{12}$ needs to be fine-tuned. For the first amplification stage 102 to work properly, it is required that the distance from the focal point of lens $L_1$ to the surface of lens $L_2$ be $f_2$ or, equivalently, $s_{12} = f_1 + f_2$. For the second amplification stage 104 to work properly, as above analysis shows, the distance from the focal point of lens $L_1$ to the surface of lens $L_2$ must be $bfl_{23} = f_2 \times 12/11$, which is $f_2 \times 1/11$ larger than the above defined distance $s_{12}$. To ensure that both amplification stages work properly, the distance between lenses $L_1$ and $L_2$ can be adjusted to a new value of $ss_{12}$, so that $ss_{12} = (f_2 + f_1) + f_2 \times 1/11$. The final result would be that the first amplification stage 102 provides the same amplification factor for beam deflection, with a slight difference from the standard Keplerian telescope in that the output light beam from lens $L_2$ is not exactly a collimated beam, but is slightly converging. The slightly converging light beam $B_2$ from lens $L_2$, after passing through negative lens system $L_3$, becomes accurately collimated. Therefore, the second stage amplification 104, as described above, can provide both appreciable amplification value and a high quality output light beam $B_3$. The closely coupled two-stage amplification lens system ensures that the two conditions can be simultaneously satisfied.

The above data shows that the three-lens system $L_1 + L_2 + L_3$ can provide a large amplification $A = A_{12} \times A_3$ ($f_2/f_1) \times (s_{23}/f_3$) and a collimated output beam $B_3$. The maximum output deflection angle can closely approach ±90°. For example, when the initial deflection angle is ±1°, $A_3 = (f_2/f_1) = 10$, and $(s_{23}/f_3) = 6$, the output deflection angle is ±60°. Thus, through the above-described two-stage amplification, the maximum output deflection angle can far exceed the capability of classical telescope lens systems.

Note that the beam deflection amplifier of FIG. 7 has only a single negative lens $L_3$ coupled with the positive lens $L_2$. This represents only the most basic configuration of the deflection amplifier. In practical systems, a number of lenses can be used as a lens assembly, as long as the basic characteristic of the negative lens is maintained. As described above, the basic characteristic is that, after beam $B_2$ is emitted from lens $L_2$, it does not cross the optical axis more than once. As shown in FIG. 8, the second amplification lens assembly 104 can have more than one negative lens, and can have a number of additional positive lenses to further enhance system performance. The enhancements include providing aberration correction and system optimization. In any case, the correction of aberration and lens system optimization is a higher order approximation that generally does not cause a change of the basic features in the first order approximation. In the final lens system design, the above general feature will be maintained. This is generally true for any lens design.

In addition, by using more than one negative lens with different diameters and different surface curvature located at different distances from lens $L_2$ on the optical axis, an optimized large amplification factor can be provided while at the same time maintaining light beam $B_2$ well within a center area of the lenses in the lens assembly. when using an optimized lens assembly for the second amplifier stage 104, the output deflection angle can closely approach ±90°.

Note that even though multiple lenses, including multiple positive and negative lenses, can be used as a lens assembly to execute the basic function of lens $L_3$ as described above, in final analysis, according to geometric optics, the whole lens assembly can still be represented by a single negative lens with a focal length $f_3$, located at a distance $sd_{23}$ from lens $L_2$ at the first order of approximation. The above-described amplification formulas will still hold true.

2. Second Beam Deflection Amplifier Embodiment

Figure 9:
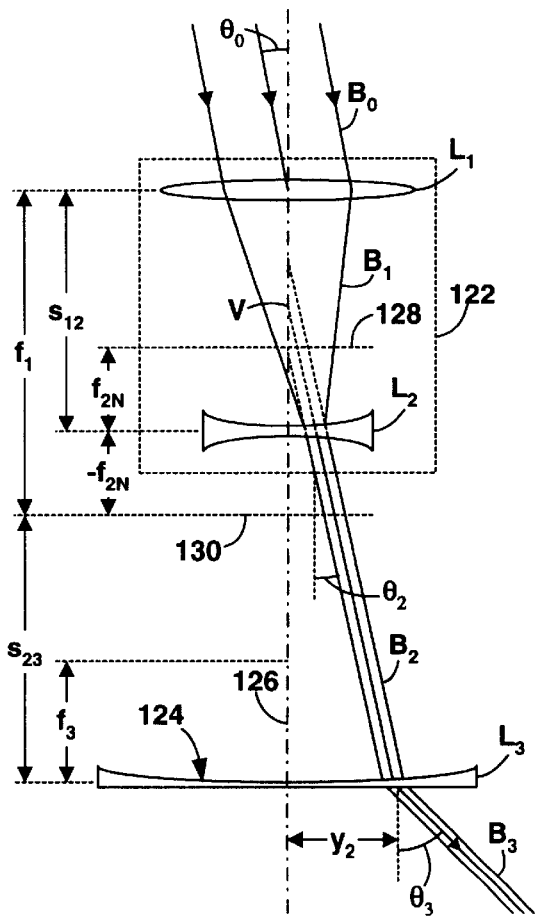
FIG. 9 is a schematic diagram of the second embodiment of the beam deflection amplifier.

The second preferred embodiment of the beam deflection amplifier 16 also comprises two stages of amplification, as shown in FIG. 9. The first amplification stage 122 is essentially a Galilean telescope lens system. The second amplification stage 124 is a negative lens system optically coupled to the first amplification stage 122. As with the first embodiment above, the most important criteria of the present invention for achieving a large output deflection angle at the output of the second amplification stage 124 is to make sure that the light beam $B_2$ always angles away from the optical axis 126. In simple and unified mathematical terms, the slope of the light beam u remains that same or increases relative to the optical axis 126 throughout the second amplification stage 124.

A Galilean lens system comprises essentially a pair of lenses, lens $L_1$ having a positive focal length $f_1>0$ and lens $L_2$ having a negative focal length $f_2<0$, where $f_1>|f_2|$. The two lenses are separated by a distance $s_{12}$ so that $f_1+f_2=s_{12}$. When a collimated light beam with a small deflection angle $\theta_0$ relative to the optical axis 126 is incident on lens $L_1$, the output light beam $B_2$ from lens $L_2$ will have a larger deflection angle $\theta_2$ relative to the optical axis 124, where $\theta_2/\theta_0=f_2/|f_1|>1$. This is an established, well-known method for increasing the deflection angle of a light beam. The limitation of this lens system $L_1+L_2$ is that the maximum output deflection angle cannot be large because the radius $r_2$ of lens $L_2$ must be small. In addition, the light beam must only impinge on a limited central area with a radius $r_c<r_2$, otherwise lens aberrations would be unacceptable relative to that of lens $L_1$. Keeping the light beam inside the area $r_c$ means that the output deflection will be very limited. This corresponds to the same limitation discussed above relative to the Keplerian lens system of the first embodiment. Note that the Galilean lens system intrinsically does not permit insertion of a field lens. Thus, this limitation cannot be overcome and the prior art contains no effective method for improving this limitation. As a result, the Galilean lens system is usually considered inferior to the Keplerian lens system because the maximum deflection angle for a Galilean lens system is less than that of the Keplerian system.

The present invention provides an effective method for significantly improving the maximum deflection angle of the Galilean lens system when used for light beam deflection to meet the requirements of modern optics. The basic method is to add a second stage of amplification. The following shows that a two-stage deflection angle amplifier provides a large output deflection angle with good output beam quality. The basic construction and analysis are the same as those described above for the Keplerian lens system of the first embodiment. The difference is that the positive lens $L_2$ is replaced with a lens $L_{2N}$ having a negative focal length $f_{2N}$, and the corresponding geometric configuration is modified for the negative lens.

Because lens $L_{2N}$ has a negative focal length, its focal plane 128 for forward light beam propagation (from lens $L_1$ to lens $L_{2N}$ to lens $L_3$) is located between lenses $L_1$ and $L_{2N}$. This is also the common focal plane of lens system $L_1+L_{2N}$. Because $f_1>>|f_{2N}|$, the output light beam $B_2$ from lens $L_2$ is also a narrow beam as in the case of Keplerian system. Since the width of the beam $B_2$ is small, the output beam $B_2$ from lens $L_{2N}$ can be approximately described as a ray that is emitted from the optical axis 124 at point V. The behavior of beam $B_2$ passing through the second stage lens $L_3$ can be calculated by paraxial ray formulae. According to the paraxial approximation, a negative lens with a focal length $f_3$, located at distance $s_{23}$ tends to bend the ray trace outwardly by an additional slope of $\Delta u_{23}=u_3-u_2=\tan(\theta_3)-\tan(\theta_2)=y_2/f_3$, where $y_3$ is the height of the beam $B_2$. Since $y_2=u_3 \times s_{23}$, the amplification factor of the second stage is $A_3=s_{23}/f_3$. As long as the distance $s_{23}$ is sufficiently large and lens $L_3$ is constructed with an appropriately large size, the amplification factor can range from about 2 to about 10, and the output deflection angle can be as large as $\pm 90°$.

In addition to the requirement that the lens system provide amplification, it is also necessary that it provide a collimated light beam output. If beam $B_3$ is a collimated beam, it will diverge from the optical axis 126 because lens $L_3$ is negative. By appropriately choosing the parameters $f_2$, $f_3$, $s_{23}$, and fine-tuning the distance $s_{12}$, all the required performance parameters can be consistently achieved. To show this, consider lens pair $L_3+L_{2N}$ looking from the reverse direction of light propagation, that is, from the output surface of lens $L_3$ along the direction $L_3$ to $L_{2N}$ to $L_1$. When using thin lens approximations, the combined back focal length $bfl_{23}$ for lens pair $L_3+L_{2N}$ is $bfl_{23}=f_2 \times (f_3-s_{23})/(f_2+f_3-s_{23})$. If $f_2>0$, $f_3=-m_3 \times f_2<0$, where $m_3$ is an integer between 1 and 5, inclusive, and $s_{23}=-m_s \times f_3=m_s \times m_3 \times f_2$, where $m_s$ is an integer between 1 and 5, inclusive, then the back focal length $bfl_{23}=f_2 \times (m_3+m_s \times m_3)/(m_3+m_s \times m_3+1)$. The integer parameters $m_3$ and $m_s$ can vary in a broad range to meet different amplification requirements. For example, when $m_3=3$ and $m_s=3$, the back focal length would be $bfl_{23}=f_2 \times 12/13$. Because $f_2<0$, the absolute value $|bfl_{23}|$ is only slightly smaller than $|f_2|$. The back focal length is the distance from the back surface of the back lens to the focal point of the lens system. A negative back focal length represents the fact that the focal plane position is located between lenses $L_{2N}$ and $L_3$ instead of outside of the lens pair. Actually, the above data shows that the focal plane of lens system $L_{2N}+L_3$ is located close to the focal plane 130 of lens $L_1$. Thus, in order to keep the output beam $B_3$ collimated, only a minor change to S12 needs to be made that does not significantly affect system parameters. Specifically, $s_{12}$ only needs to be decreased from the original design value $s_{12}=f_2+f_1$, where $f_2<<f_1$, by the amount $1/12 \times f_2$. This small decrease of $s_{12}$ has no significant adverse impact on any other system characteristics.

This analysis shows that the three-lens system $L_1+L_{2N}+L_3$ provides a lens system with a large amplification $A=K_{12} \times K_3 \equiv (f_2/f_1) \times (s_{23}/f_3)$ with a collimated output beam.

Note that the beam deflection amplifier as shown in FIG. 9 only has one single negative lens $L_3$ coupled with the positive lens $L_2$. This represents only the most basic configuration of the amplifier. In practical systems, a number of lenses can be used as a lens assembly, as long as the basic characteristic of the negative lens in the second embodiment is maintained. The basic feature of the second amplification stage 124 in the second embodiment is, as described above, after beam $B_2$ is emitted from lens $L_2$, it does not cross the optical axis 126. This differs from the first embodiment, where once beam $B_2$ is emitted from lens $L_2$, it crosses the optical axis only once.

Figure 10:
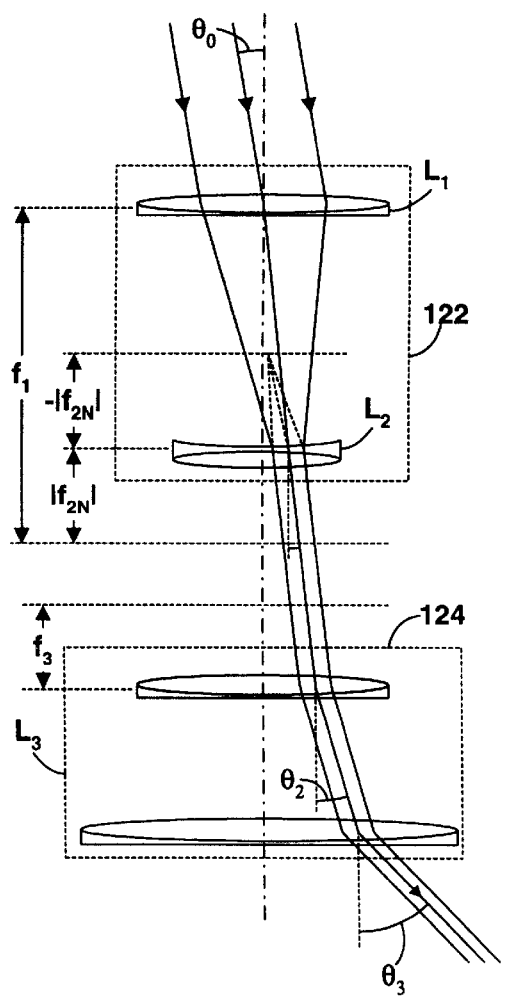
FIG. 10 is a schematic diagram of the second embodiment of the beam deflection amplifier with enhancement.

As shown in FIG. 10, the second amplification lens assembly 124 can have more than one negative lens, and can have a number of additional positive lenses to further enhance system performance. The enhancements include providing aberration correction and system optimization. In any case, the correction of aberration and lens system optimization is a higher order approximation that generally does not cause a change of the basic features in the first order approximation. In the final lens system design, the above general feature will be maintained. This is generally true for any lens design.

In addition, by using more than one negative lens with different diameters and different surface curvature located at different distances from lens $L_2$ on the optical axis, an optimized large amplification factor can be provided while at the same time maintaining light beam $B_2$ well within a center area of the lenses in the lens assembly. When using an optimized lens assembly for the second amplifier stage 104, the output deflection angle can closely approach ±90°.

Note that even though multiple lenses, including multiple positive and negative lenses, can be used as a lens assembly to execute the basic function of lens $L_3$ as described above, in final analysis, according to geometric optics, the whole lens assembly can still be represented by a single negative lens with a focal length $f_3$, located at a distance $sd_{23}$ from lens $L_2$ at the first order of approximation. The above-described amplification formulas will still hold true.

3. Third Beam Deflection Amplifier Embodiment

Figure 11:
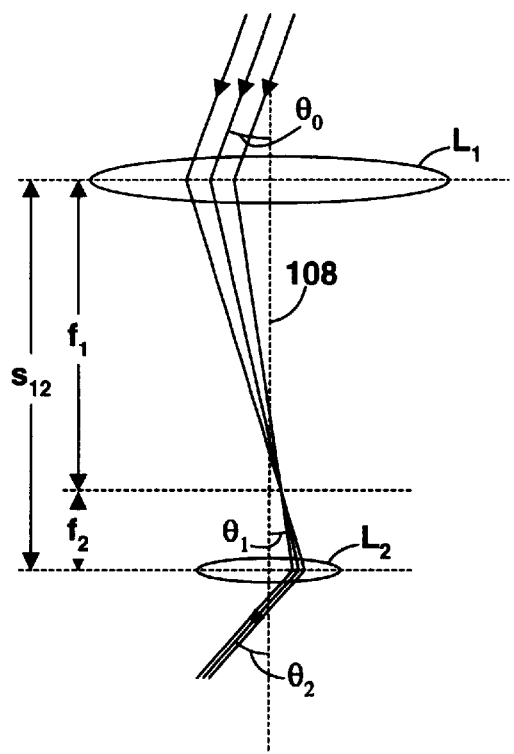
FIG. 11 is a schematic diagram of the third embodiment of the beam deflection amplifier.

The third preferred embodiment of the beam deflection amplifier 16 is to use a standard telescope lens system. A standard telescope lens system comprises two lenses with different focal lengths. One lens is objective, the other is an eyepiece. The amplification is basically determined by the ratio of the focal length of the two lenses, as described in standard optics texts. There are two types of telescope lens systems the perform the same function for amplification of deflection angle, Keplerian and Galilean telescope lens systems. While the Keplerian telescope is used as an example for description, the principles and conclusions are equally applicable to both. As shown in FIG. 11, the Keplerian telescope lens system comprises essentially a pair of positive lenses, lens $L_1$ having a focal length $f_1$ and lens $L_2$ having a focal length $f_2$, where $f_1>f_2>0$. The two lenses are separated by a distance $s_{12}$ such that $f_1+f_2=s_{12}$. According to thin lens formulae, the focal length of the Keplerian telescope lens system is $f_{12}=f_1 \times f_2/(f_1+f_2-s_{12})$. Since $(f_1+f_2-s_{12})=0$, $f_{12}$ is infinite. Thus, the lens system meets the first two requirements of the deflection angle amplifier: when a collimated light beam $B_0$ with a small deflection angle $\theta_0$ relative to the optical axis 108 is incident on the lens $L_1$, the light beam $B_2$ from the lens $L_2$ will also be collimated and will have a deflection angle $\theta_2$ relative to the optical axis 108 governed by the relationship $\tan(\theta_2/\theta_1) \cong \theta_2/\theta_1 = f_1/f_2 > 1$. This is an established method for increasing the deflection angle of a light beam.

A typical value for deflection angle amplification through use of standard telescope system is 10, and with a maximum output deflection angle approximately 10° with an input deflection angle of 1°.

4. Fourth Beam Deflection Amplifier Embodiment

The fourth preferred embodiment of the beam deflection amplifier 16 is to use a compound lens system as lens $L_2$. A number of such improved structures for the second lens $L_2$ have been available. Examples include the Huigenian eyepiece and Ramsden eyepiece, each having 2 lens elements, the Kellner eyepiece and RKE eyepiece, each having 3 lens elements, the Orthoscopic eyepiece and Plossl eyepiece, each having 4 lens elements, and the Erfle eyepiece having 5 or 6 lens elements. These lens systems with a compound focusing lens structure can improve the maximum output deflection angle to some extent. For example, when the beam quality requirements are high, that is, the acceptable beam divergence, chromatic aberration, distortion are very low, a typical value of 15° for maximum output deflection angle can be achieved through use of compound lens systems. When beam quality requirements are low enough, a maximum output deflection angle of 20° can be provided.

Figure 12:
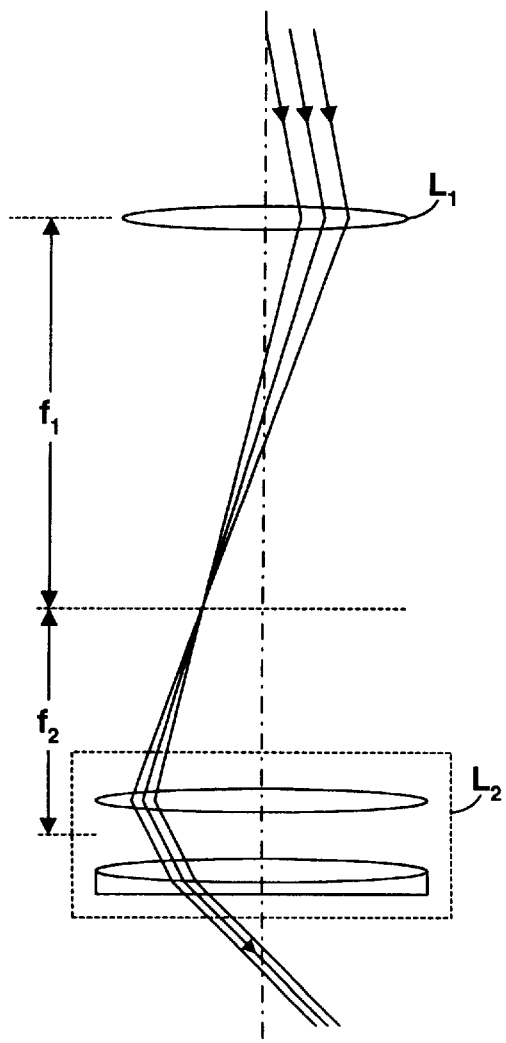
FIG. 12 is a schematic diagram of the fourth embodiment of the beam deflection amplifier.

The fourth embodiment of the deflection angle amplifier using a compound lens RKE eyepiece with 3 lens elements as the output lens $L_2$ is shown in FIG. 12.

5. Fifth Beam Deflection Amplifier Embodiment

The fifth preferred embodiment of the beam deflection amplifier 16 is the lens system as disclosed in the U.S. patent application Ser. No. 09/503,828. The lens system disclosed in patent application Ser. No. 09/503,828 can provide an output deflection angle approaching ±90°, essentially covering an entire half-space.

Note that the present invention contemplates some variations to the above described embodiments based on standard practices with optical devices. Generally, in an optical system designed for executing a specific function, accessory optical components may be inserted in order the enhance system performance without changing the basic function of the system. These accessories can include, for example, mirrors, prisms, beam splitters, field lenses, relay lenses, coatings, etc.

Note, also, that lens can be a single simple lens or a combination of a number of lenses. Thus, the present invention contemplates that any arbitrary regrouping of lens elements in a lens systems can be used.

Thus it has been shown and described a dynamically-controllable light beam deflector which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A light beam deflector adapted for deflecting a source light beam emitted from a light source, said deflector having an optical axis and comprising:

(a) in physical order, an initial beam deflector and a beam deflection amplifier;

(b) said initial beam deflector receiving said source light beam and emitting an initially deflected light beam at an initial deflection angle $\theta_0$;

(c) said initial beam deflector including an electro-optic deflector;

(d) said beam deflection amplifier having a deflection angle amplification factor A>1; and (e) said beam deflection amplifier receiving said initially deflected light beam and transmitting a fully deflected light beam at a full deflection angle $\theta=A\theta_0$.

2. The light beam deflector of claim 1 wherein said initial beam deflector comprises a transparent photorefractive material, an appropriately applied electric field for electro-optic deflection adapted to control said deflection angle $\theta_0$, and a suppressing light source, said suppressing light source having an intensity at least two times the intensity of said source light beam.

3. The light beam deflector of claim 1 wherein said initial beam deflector comprises a transparent photorefractive material, an appropriately applied electric field for electro-optic deflection adapted to control said deflection angle $\theta_0$, and a homogenizing electric field, said homogenizing electric field having an intensity and an orientation not adversely affecting said electro-optic deflection.

4. The light beam deflector of claim 1 wherein said initial beam deflector comprises a transparent photorefractive material and an appropriately applied electric field for electro-optic deflection adapted to control said deflection angle $\theta_0$, and a process of changing the temperature of said material to a temperature at or near the Curie point, applying a homogenizing electric field during the temperature change, gradually returning said temperature back to a working temperature, and removing said homogenizing electric field.

5. The light beam deflector of claim 1 wherein said initial beam deflector comprises a transparent photorefractive material and an appropriately applied electric field for electro-optic deflection adapted to control said deflection angle $\theta_0$, and a process of changing the temperature of said material to a temperature at or near the Curie point and gradually returning said temperature back to a working temperature.

6. The light beam deflector of claim 1 wherein said beam deflection amplifier includes a first amplification stage and a second amplification stage, said second amplification stage including a negative lens.

7. The light beam deflector of claim 6 wherein said beam deflection amplifier first amplification stage includes at least two positive lenses.

8. The light beam deflector of claim 6 wherein said beam deflection amplifier first amplification stage includes, in physical order, a positive lens and a negative lens.

9. The light beam deflector of claim 1 wherein said amplification factor A is a constant.

10. The light beam deflector of claim 1 wherein said amplification factor A is a function of said initial deflection angle $\theta_0$.

* * * * *